G. B. SHEPARD.
Machine for Twining Wreaths.
No. 209,100.  Patented Oct. 15, 1878.
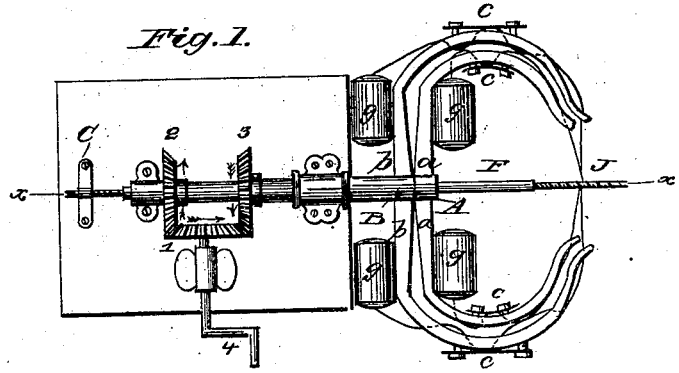
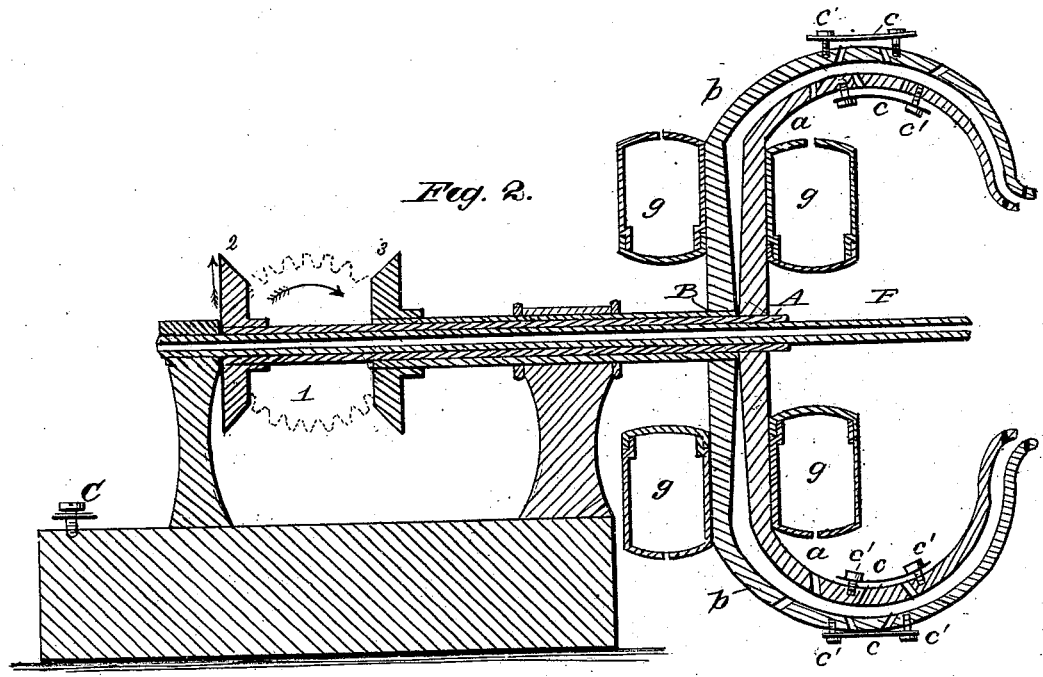

UNITED STATES PATENT OFFICE.

GEORGE B. SHEPARD, OF OGDENSBURG, NEW YORK.

IMPROVEMENT IN MACHINES FOR TWINING WREATHS.

Specification forming part of Letters Patent No. 209,100, dated October 15, 1878; application filed October 13, 1877.

*To all whom it may concern:*

Be it known that I, GEORGE B. SHEPARD, of the city of Ogdensburg, in the county of St. Lawrence and State of New York, have invented certain new and useful Improvements in Machines for Twining Wreaths; and I do hereby declare that the following is a full, clear, and exact description thereof, sufficient to enable others skilled in the art to which my invention appertains to make and use the same, reference being had to the accompanying drawings, and to the letters of reference marked thereon, and in which—

Figure 1 is a plan view of my improved machine, with the twining-cords in position for binding the wreaths or other article to be operated upon; and Fig. 2 is a vertical longitudinal section thereof on line $x\ x$ of Fig. 1.

The same part in the two figures is denoted by the same letter.

The object of this invention is to rapidly and firmly bind the ends of evergreen twigs, or other suitable material for making ornamental wreaths, so as to form a continuous wreath thereof; and it consists of a central tubular shaft, around which revolve two oppositely-moving arms, carrying the binding twine or cord and tension-spring, substantially as hereinafter more fully set forth.

In the drawing, F is a central tubular shaft, surrounding which is a second similar shaft, A, to one of whose ends are attached two arms, $a\ a$, socketed or otherwise fitted thereon. A third similar shaft, B, fits upon the shaft A, and has affixed to that end thereof adjacent to the armed end of the shaft A two arms, $b\ b$, similar to arms $a\ a$—i. e., extended outwardly and preferably toward each other, as shown. The shafts are journaled upon suitable supports or uprights fastened to the floor or a base-piece. To the shaft B is adjusted a beveled gear-wheel, 3, and to the shaft A is likewise attached a similar gear-wheel, 2, with both of which wheels engages a single beveled gear-wheel, 1, driven by a crank-shaft, 4, or other suitable means, and through which gear-wheels an oppositely-revolving motion is imparted to the shafts A B and their arms.

$g\ g$ are boxes of any suitable construction and capacity, for holding the balls or masses of twine or cord, fastened to the arms $a\ b$, and having perforated covers for passing the twine or cord therefrom, after which it is taken from each box through apertures, three or more in number, in the outer portions of the arms $a\ b$, as clearly shown in Fig. 1, and finally passed through apertures in the free ends or extremities of the said arms. The cord or twine is taken at this point and passed directly around the material from which the wreath is to be made.

The wreath may be strengthened by being formed around a cord that is passed through the tube F, and to which said material is secured by interposing the material between the winding twine or cord and the rope or cord, as seen at J, Fig. 1.

Upon the upper or outer surface of the bowed portion of the arms $b$ and upon the inner surface of the bowed portion of the arms $a\ a$ are arranged springs $c\ c$, as seen in the two figures, which springs are each so disposed as to rest in close proximity to the binding-twine, where looped through the arms $a\ b$, as clearly shown in Fig. 1, to effect the tightening or loosening of the twine, thus regulating its tension. Each end of a spring is connected to an arm by an adjusting-screw, $c'\ c'$, by which the pressure of the springs upon the passing or moving twine is varied. C is also a tension-spring, beneath which the strengthening-cord is passed, as seen in Fig. 1.

Having thus fully described my invention, I claim and desire to secure by Letters Patent of the United States—

In a machine for twining wreaths, &c., the combination of the central tubular shaft F with the oppositely-revolving arms $a\ b$, arranged upon concentric shafts driven by suitable gearing, and provided with cord or twine passages, tension-regulating springs $c\ c'$, and boxes $g\ g$, substantially as and for the purpose set forth.

GEORGE B. SHEPARD.

Witnesses:
JOHN H. FINDLAY,
A. B. JAMES.